(No Model.) 4 Sheets—Sheet 1.
A. G. FITZ.
LATHE FOR ROUGHING LASTS.

No. 485,621. Patented Nov. 8, 1892.

WITNESSES:
Frank H. Wilbur,
Hermon H. Niles.

INVENTOR
Amos G. Fitz
BY Alinon Robinson
ATTORNEY.

(No Model.) 4 Sheets—Sheet 3.

A. G. FITZ.
LATHE FOR ROUGHING LASTS.

No. 485,621. Patented Nov. 8, 1892.

WITNESSES:
Frank H. Wilbur.
Hermon H. Niles.

INVENTOR
Amos G. Fitz
BY Almon Robinson
ATTORNEY.

(No Model.)  4 Sheets—Sheet 4.

A. G. FITZ.
LATHE FOR ROUGHING LASTS.

No. 485,621.  Patented Nov. 8, 1892.

WITNESSES:
Ella M. Robinson
Mary J. Robinson

INVENTOR
Amos G Fitz
BY
Almon Robinson
ATTORNEY.

UNITED STATES PATENT OFFICE.

AMOS G. FITZ, OF AUBURN, MAINE.

LATHE FOR ROUGHING LASTS.

SPECIFICATION forming part of Letters Patent No. 485,621, dated November 8, 1892.

Application filed July 3, 1891. Serial No. 398,439. (No model.)

*To all whom it may concern:*

Be it known that I, AMOS G. FITZ, a citizen of the United States, residing at Auburn, in the county of Androscoggin and State of Maine, have invented a new and useful Lathe for Roughing Lasts, of which the following is a specification.

The object of my invention is, primarily, to provide a machine for rapidly and automatically shaping rough-turned last-blocks; but, while it is especially designed and adapted for that purpose, its more essential features are equally useful in machines for rapidly shaping wood for many other purposes.

My invention relates to that class of machines in which the revolving cutter remains stationary and the swinging frame traverses back and forth in front of it; and it consists, primarily, in an improved combination of parts for such a machine.

My invention further comprises a combination of parts for automatically stopping the traversing motion of the swinging frame at any desired point.

My invention further comprises a combination of parts for automatically pushing the swinging frame away from the revolving cutter at the end of its traverse.

My invention further comprises a combination for automatically stopping the rotation of the block when the frame is thus swung outward.

My invention further comprises a combination which insures that the spur-center rotating the block shall always stop in the same position.

My invention further comprises a combination of parts which insures the turning of a block for a right last when the frame traverses in one direction and of a left last when it traverses in the other.

My invention also comprises various details hereinafter fully set forth.

Figure 1:
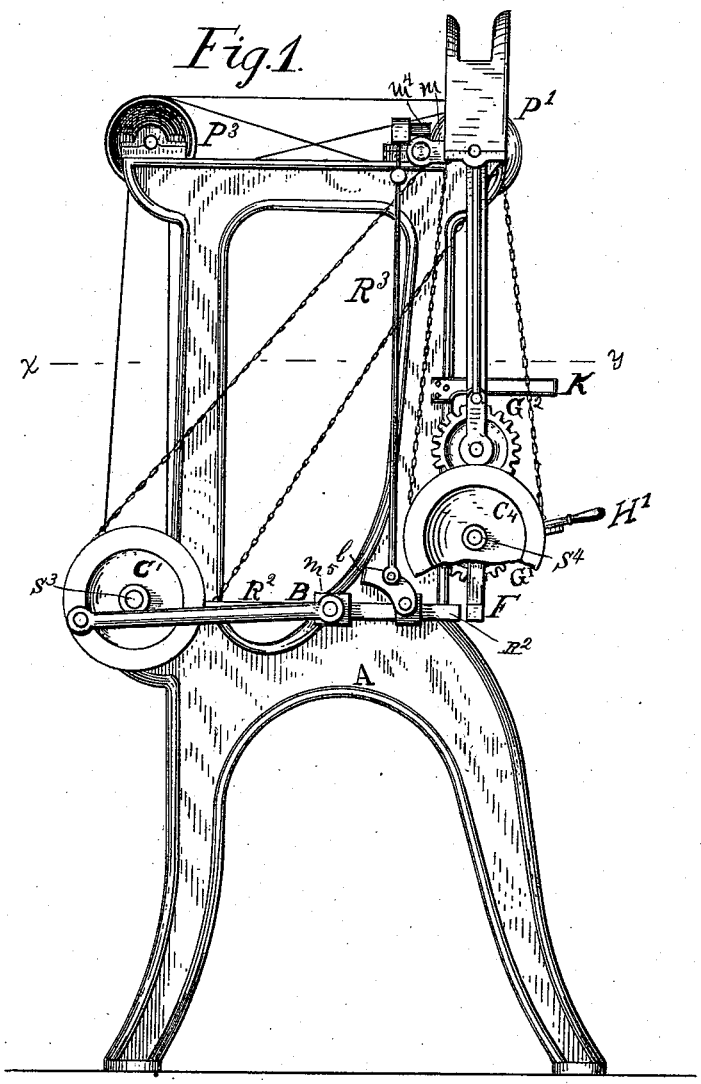
Figure 2:
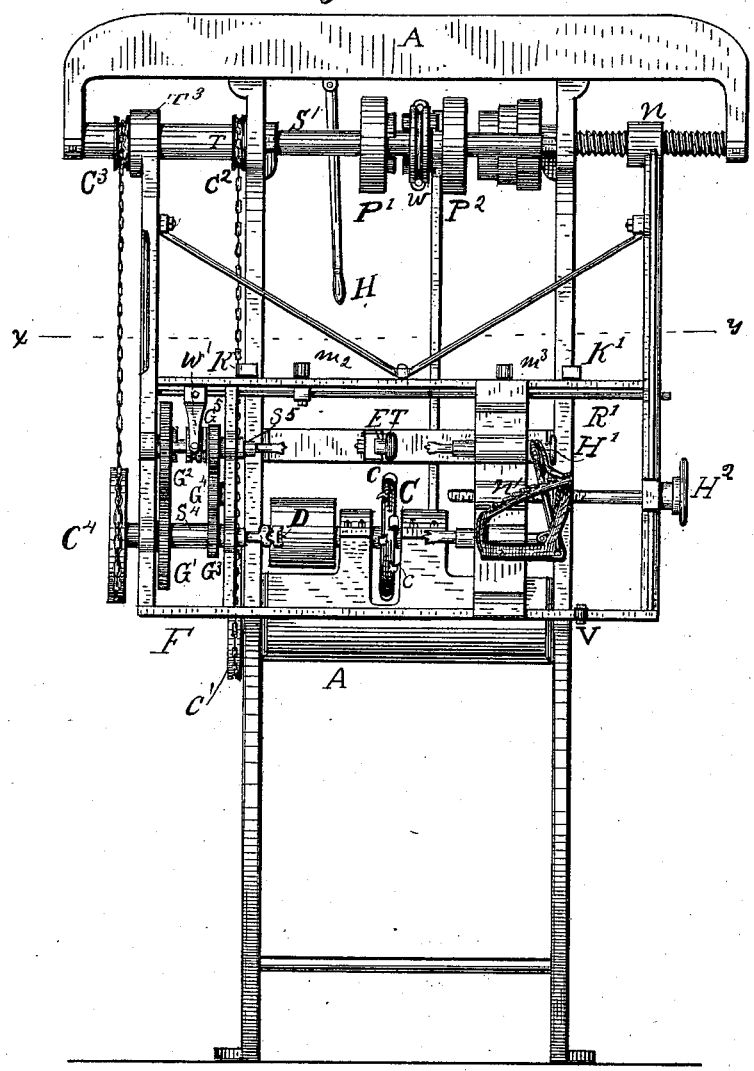
Figure 3:
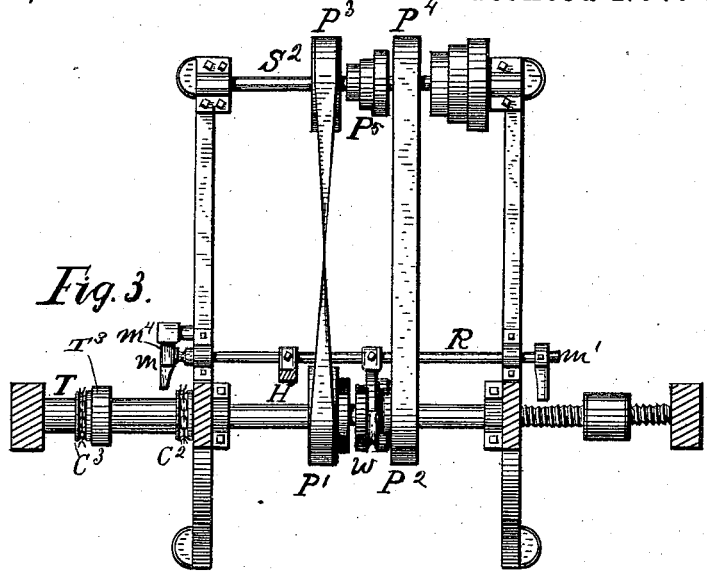
Figure 4:
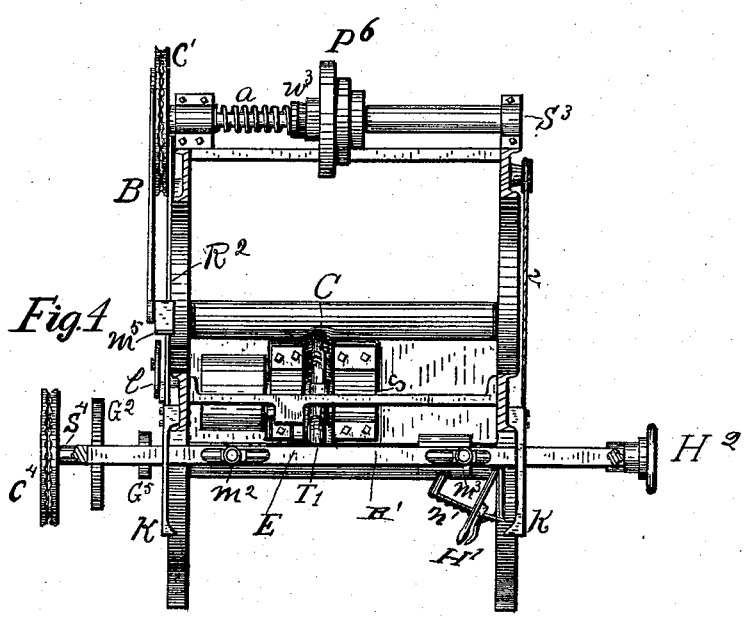
Figure 5:
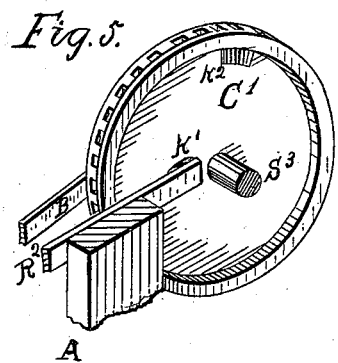
Figure 6:
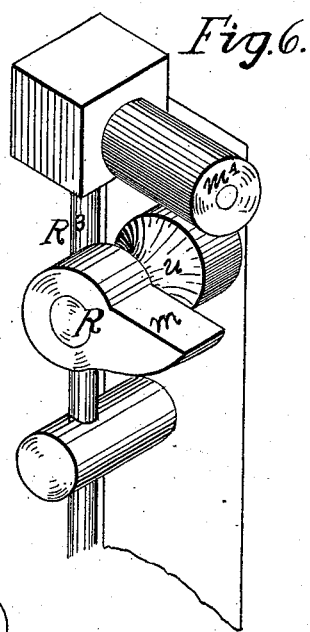
Figure 8:
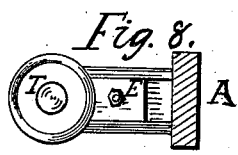
Figure 9:
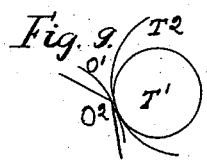
Figure 7:
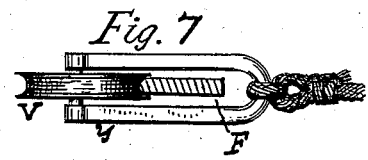

In the accompanying drawings, Figure 1 is an end elevation of the machine. Fig 2 is a front elevation of the machine. Fig. 3 is a plan of the top of the machine, showing the traversing gear of the swinging frame, other parts being omitted. Fig. 4 is a sectional plan below the line $x\,y$, Fig. 1. Fig. 5 is a perspective of the combination for stopping automatically the rotation of the block. Fig. 6 is a perspective of a part of the combination which swings out the frame at the end of its traverse. Fig. 7 shows the yoke and roller used to pull back the swinging frame. Fig. 8 shows the model wheel or roller and its adjusting-slide. Fig. 9 is a diagram which illustrates the working of the improved models and pressure-wheel used.

In the drawings, A is the framework of the machine. C is the rotating cutter; $c\,c$, knives arranged upon both sides of its rim. S is the driving-shaft of the cutter C. F is the swing-frame, which carries the last or other block. It hangs from the shaft S' at one end by a collar $T^3$, which slides upon the sleeve T, at the other by a nut $n$, which traverses the screw-threaded end of the shaft S'. Upon this shaft are mounted two loose pulleys P' $P^2$, which are connected by an open and a crossed belt with the pulleys $P^3$ $P^4$ upon the counter-shaft $S^2$. Between the pulleys P' and $P^2$ is the clutch W, which is rigidly connected with the shifting rod R. Upon the rod are the stops $m\,m'$, which when struck by the sides of the swinging frame slide the rod R and move the clutch W out of connection with the pulleys P' $P^2$. The handle H serves to move the shifting rod still farther in the same direction and to bring the clutch into connection with the other pulley. Upon the counter-shaft $S^2$ is placed a cone-pulley $P^5$, which is connected with a corresponding cone $P^6$ upon the shaft $S^3$ by a belt. This shaft $S^3$ has upon its outer end a chain-wheel C', which is connected by a chain with the small chain-wheel $C^2$ upon the sleeve T. The wheel $C^2$ is fixed upon the sleeve T. The wheel $C^3$ of the same size is connected with the sleeve T by a pin and slot which compel it to turn with the sleeve and is connected with the traversing frame F by a pin and groove which constrain it to slide back and forth with it as the frame moves back and forth. It is connected by a chain with the chain-wheel $C^4$ upon the shaft $S^4$. The wheels C' $C^4$ are of the same size and their revolutions therefore correspond. Upon the other end of the shaft $S^4$ is the spur-center D. It also has upon it the gear-wheels G' $G^3$. The gear G' meshes into the gear $G^2$, which is loose upon the shaft $S^5$. The gear $G^3$ turns the loose gear $G^5$ through the intermediate gear $G^4$. The shaft $S^5$ turns a model which controls the shape of the block to be turned. This model vibrates the swinging frame by pressing against the roller T, mounted upon a sliding piece E, that is adjustable to and from the frame F. Between the gears $G^2$ and $G^5$ is the clutch $w'$, which is operated by the rod $R'$. Attached to the rod are two rollers $m^2$ $m^3$. These are so adjusted that at the end of the traverse of the swinging frame in either direction one of them comes close to the corresponding guide-arm K or $K'$. If the frame F is now swung outward, the curved part at the outer end of the guide-arm comes in contact with the roller and moves the clutch $w$ out of connection with one gear and into connection with the other. The clutch $w$ is what is known as a "one-pin clutch," and should have such an amount of lost motion that the last block will gain a half-revolution at each reversal.

The frame F is swung outward by the sliding rod $R^2$. A catch $l$, attached to $R^2$, is held up by the rod $R^3$, which has at its upper end a roller $m^4$, resting upon a sleeve on the end of R. When R is moved so as to bring the clutch $w$ to its central position, the roller $m^4$ falls into the notch $u$ and the catch $l$ drops until it is struck by the sliding sleeve $m^5$, which receives its motion from the wheel $C'$ through the connecting-rod B. The wheel $C'$ is mounted upon the shaft $S^3$. Its driving-pulley $P^6$ is mounted upon a loose sleeve. A friction-clutch $W^3$ is fixed upon the shaft and pressed into contact with the pulley-sleeve by the spring $a$. When the projection $k$, Fig. 5, upon the sliding rod $R^2$ is moved outward, it is struck by the projection $k^2$ upon the wheel $C'$. The wheel $C'$ is thereby forced outward and the clutch $W^3$ freed from contact with the driving-pulley. The surfaces $k$ $k^2$ wedge together and hold all the connected parts in place until released by the backward movement of the sliding rod $R^2$, when the catch $l$ is lifted.

The frame F is pulled inward by a weight attached to a cord which is fastened to a yoke $y$, carrying a roller V, which bears upon the front of the frame F and adjusts itself as the frame traverses back and forth, as shown in detail in Fig. 7. It will be understood that as the roller rolls freely upon the swinging frame F it will always be pulled into such a position that the cord will be nearly at right angles to the frame. A spring or a combination of a spring and a weight may be substituted for the weight, and its mode of attachment may be considerably varied when desired. The spur-center D is shown and described in an application for a patent for an improved lathe-chuck for wooden blocks, which was filed as a separate application March 14, 1892, and is numbered 424,925. The dead-center of the last block is attached to a sliding rod and is pressed inward by the lever $H'$, which is held in place by a pawl catching in the notched arc $n'$.

The models used and the model-wheel or pressure-roller $T'$ are constructed upon a new principle, which is illustrated by the diagram Fig. 9. Heretofore such machines have had instead of the roller $T'$ a stationary curved surface corresponding with that described by the revolving cutters. A roller of the full size of the curved surface above mentioned would make it necessary to separate the model and block to an inconvenient distance; but by using the small roller $T'$, mounted upon an adjusting-piece E, the machine will be more compact and will run more smoothly. In using this small roller I change the shape of the models to correspond. Fig. 9 is a diagram illustrating this change. In this figure $T'$ is a sectional outline of the small roller or model-wheel; $T^2$, an outline of a full-sized roller or stationary piece. $O^2$ is a sectional outline of a corner of a model which is exactly the shape to which the block is to be cut. $O'$ shows the outline, which when used with $T'$ would cut approximately the same shape as $O^2$ with $T^2$. This change in the shape of the model consists in adding to its diameter at every point as much as the point where it touches $T'$ falls back from the point where it would have touched $T^2$. The rounded outline thus given to the model is a help in the smooth and rapid working of the machine. The frame carrying the dead-centers of both the last and the model is moved in and out by means of a screw turned by the hand-wheel $H^2$.

When I desire to make use of my invention, I proceed as follows: I first secure a model of the piece to be turned between the live-center of the model-shaft and the corresponding dead-center. I then take a block of wood of suitable size and shape, hold it in the proper position, and press in the centers by means of the lever $H'$, which is afterward kept in place by a ratchet. I next move the lever H in the direction corresponding to that in which the swinging frame F is to traverse. This brings the clutch W into connection with the proper pulley to give the traversing motion desired. It also lifts the roller $m^4$ out of the groove $u$, thereby raising the catch $l$ and releasing the pushing-bar $R^2$, which is pressed inward and releases the crank-disk and permits the spring $a$ to press the friction-clutch $W^3$ against the pulley $P^5$. The block, revolving as it goes, will now traverse in front of the revolving cutter C, and its shape will be determined by the pressure of the revolving model upon the roller $T'$. When the swinging frame F has reached the end of its traverse, it strikes a stop $m$ or $m'$ on the shifting rod R, throws the clutch W out of the pulley, and brings the groove $u$ under the roller. The catch $l$ then drops in front of the sliding piece $m^5$ and the rod $R^2$ is pushed outward, carrying with it the swinging frame F. As the projection $K'$ upon the pushing-rod $R^2$ approaches the rim of the chain-wheel $C'$, it is struck by the corresponding projection $K^2$ upon this rim. The wedging of these projections releases the clutch and holds all the connected parts in place until the catch is again lifted. As the chain connections do not admit of slip between the pulleys, it will be seen that the live-center which turns the block is always in precisely the same position when the frame is at the outer limit of its swing. This is a great convenience in putting in the block. As the frame approaches the outer limit of its swing, one of the rollers $m^2$ $m^3$ strikes the curved part of one of the projecting pieces K K', and the clutch W' is thereby disengaged from one of the loose gears $G^2$ or $G^5$ and engaged with the other. It will be seen that this insures that when the frame F is traversing in one direction the model will revolve in the same direction as the block, and that when the frame is traversing back the model and block will revolve in opposite directions.

As the left last can be turned from a right model, and vice versa, by revolving them in opposite directions, it results that in turning any even number of last-blocks there will be precisely as many rights as lefts without the trouble of counting or of keeping in separate lots throughout the subsequent processes. Lasts are usually turned from blocks of a roughly-triangular cross-section, and if the model is reversed without lost motion it will be necessary to reverse the position of the broad side of the block; but by allowing, as hereinbefore stated, a lost motion of half a revolution at each reversal the last-block can be always put in with the narrow side up.

Having now fully set forth the construction of my improved lathe and the manner of using it, I wish it understood that I claim the right to make all such modifications in proportion and detail as would naturally occur to a mechanic who was called upon to adapt the machine to turning pieces differing in shape and size.

What I claim is—

1. In a lathe for roughing last-blocks, a swinging frame suspended from a revolving overhead shaft and traversed back and forth by a screw-thread upon the shaft, a pair of loose pulleys turning in opposite directions upon the shaft, a clutch between them which connects either of them with the shaft, a pair of revolving centers for the last-block, mounted on the swinging frame, and a pair of revolving centers for the model, directly or nearly above those for the block, in combination with each other and with a revolving cutter and revolving model-wheel which are mounted upon a stationary frame and are opposite to the block and model.

2. The combination of a swing-frame carrying the block to be turned, means of controlling its swinging movement, a revolving screw-threaded shaft which supports and traverses the frame, a pair of loose pulleys upon the shaft, a sliding clutch which connects them with the shaft, a shifting rod which controls the clutch, stops upon the shifting rod which throw the clutch out of gear when struck by the traversing frame, and a handle connected with the shifting rod for putting the clutch in gear with the other pulley.

3. The combination of a swinging frame carrying a rotating block, a pushing-rod for moving the frame outward, a crank upon a revolving shaft, a connecting-rod which connects the crank with a sliding piece upon the pushing-rod, a catch attached to the pushing-rod which when released falls in front of the sliding piece, and means for releasing this catch when the frame reaches the end of its traverse, all as set forth.

4. In a lathe in which the block to be turned revolves in a swinging frame, the combination of a shaft to which the block is attached, a counter-shaft from which it derives its motion, a connection between the two shafts which insures their revolving in precisely the same time, a crank attached to the counter-shaft, and means for making and breaking connection between the crank and the swinging frame, all as and for the purpose set forth.

5. The combination of a swinging frame suspended from a revolving shaft, a loose sleeve upon this shaft, a crank-shaft from which the swinging frame derives its outward motion, means of connection between the crank-shaft and the swinging frame, a sprocket-wheel upon the crank-shaft, a sprocket-wheel upon the loose sleeve connected by a chain with the wheel upon the crank-shaft, a second sprocket-wheel upon the sleeve, which turns with the sleeve and is attached to the sliding frame, and a sprocket-wheel upon the shaft that turns the rough block connected by a chain with the second wheel upon the loose sleeve, all proportioned and used substantially as and for the purpose set forth.

6. The combination of a relatively-small model-wheel with a model enlarged in diameter at every point as much as the point where it strikes the small model-wheel falls back from the point where it would have struck the larger one, all as and for the purpose set forth.

7. The combination of a swinging frame carrying the rough block and the model, a pushing-rod which moves the swinging frame outward, a crank-disk which imparts motion intermittently to the pushing-rod, a clutch on the crank-shaft which is disengaged by an endwise motion of the shaft, and corresponding projections upon the pushing-rod and upon the crank-disk, which coact to give an endwise motion to the shaft when the pushing-rod has reached the end of its traverse.

8. The combination of a shaft for imparting motion to a rough block which is mounted in a swinging frame, a second shaft which imparts motion to the model, a gear upon the block-shaft which turns a loose gear upon the model-shaft by direct contact, a second gear upon the block-shaft which turns a loose gear upon the model-shaft by means of an intermediate gear, a clutch upon the model-shaft, which is put in and out of action by a sliding rod, adjustable rollers upon the rod, and projecting pieces whose curved outer ends strike the rollers and shift the clutch when the frame is swung outward at the end of its traverse.

In witness whereof I have hereunto set my hand this 1st day of July, 1891.

AMOS G. FITZ.

Witnesses:
F. H. WILBUR,
H. H. NILES.